United States Patent
Rhodes

(10) Patent No.: US 10,780,380 B1
(45) Date of Patent: Sep. 22, 2020

(54) WELL PRODUCTION STREAM SOLID DEBRIS SEPARATOR APPARATUS

(71) Applicant: Process Equipment & Service Company, Inc., Farmington, NM (US)

(72) Inventor: James E. Rhodes, Farmington, NM (US)

(73) Assignee: PROCESS EQUIPMENT & SERVICE COMPANY, INC., Farmington, NM (US)

(*) Notice: Subject to any disclaimer, the term of this patent is extended or adjusted under 35 U.S.C. 154(b) by 197 days.

(21) Appl. No.: 15/927,148

(22) Filed: Mar. 21, 2018

(51) Int. Cl.
*B01D 45/12* (2006.01)
*B04C 5/081* (2006.01)
*B04C 5/13* (2006.01)
*B04C 5/04* (2006.01)
*B04C 5/103* (2006.01)
*E21B 43/34* (2006.01)

(52) U.S. Cl.
CPC ............... *B01D 45/12* (2013.01); *B04C 5/04* (2013.01); *B04C 5/081* (2013.01); *B04C 5/103* (2013.01); *B04C 5/13* (2013.01); *E21B 43/34* (2013.01); *B01D 2221/04* (2013.01)

(58) Field of Classification Search
CPC .. B04C 5/081; B04C 5/13; B04C 5/04; B04C 5/103; B01D 19/0057; B01D 21/26; B01D 21/267; B01D 45/12; B01D 2221/04; E21B 43/34
See application file for complete search history.

(56) References Cited

U.S. PATENT DOCUMENTS

| | | | | |
|---|---|---|---|---|
| 2,082,863 | A * | 6/1937 | Weisgerber | B01D 19/0057 96/216 |
| 2,816,658 | A * | 12/1957 | Braun | B04C 5/081 209/732 |
| 2,903,087 | A * | 9/1959 | Glasgow | B01D 19/0057 96/177 |
| 2,925,878 | A * | 2/1960 | Spann | B01D 45/02 96/189 |
| 3,853,513 | A * | 12/1974 | Carson | B01D 19/0042 96/189 |
| 4,908,049 | A * | 3/1990 | Yoshida | B04C 5/081 209/11 |
| 7,785,400 | B1 | 8/2010 | Worley et al. | |
| 8,623,221 | B1 | 1/2014 | Boyd et al. | |
| 9,327,214 | B2 | 5/2016 | Hemstock | |
| 2016/0375386 | A1 * | 12/2016 | Magnus | B01D 45/02 95/267 |

* cited by examiner

*Primary Examiner* — Liam Royce
(74) *Attorney, Agent, or Firm* — Head, Johnson, Kachigian & Wilkinson, PC

(57) ABSTRACT

A well production stream solid debris separator apparatus. The apparatus includes a spherical vessel. A cylindrical sump extends below and radially from the spherical vessel. A centrifugal cylinder is positioned within the spherical vessel, the centrifugal cylinder having an axis concentric with a diameter of the spherical vessel and having an open bottom. An outlet port passes through the cylindrical vessel and through the spherical vessel with the outlet port opposed to the cylindrical sump. An inlet port passes through the spherical vessel and passes into the centrifugal cylinder substantially tangential to an inner surface of the centrifugal cylinder.

10 Claims, 6 Drawing Sheets

WELL PRODUCTION STREAM SOLID DEBRIS SEPARATOR APPARATUS

BACKGROUND OF THE INVENTION

1. Field of the Invention

The present invention relates to separators used in oil and natural gas well completion and production operations and, more particularly, to separators particularly suited for use in separating solid debris from high-pressure production streams comprised primarily of varying percentages of oil, water, and natural gas, as most commonly encountered during flow-back from hydraulic fracturing operations.

2. Description of the Related Art

Hydrocarbons, such as oil and gas, are recovered from various subsurface geological formations. Such formations often consist of a porous layer, such as limestone and/or sands, overlaid by a nonporous layer of dense rock. Hydrocarbons become trapped beneath the nonporous layer, and thus, the porous layer becomes a reservoir in which hydrocarbons collect and reside. A well is drilled through the earth until the hydrocarbon-bearing formation is reached. Hydrocarbons then flow from the porous formation into the wellbore and thus to the surface. Sands and other solids are often found with extracted hydrocarbons and associated water or brine.

In addition, to increase the efficiency of this process, hydraulic fracturing is sometimes utilized.

Hydraulic fracturing is a process in which water and sand are pumped down the wellbore under high pressure. This causes fractures in the porous layer, and thus numerous flow paths from the hydrocarbon reservoir to the wellbore are created. In addition to fracturing the hydrocarbon bearing layer, the hydraulic fracturing process forces the added sand into the newly-created formation fractures. This sand holds the fractures open after the pressure of the hydraulic fracturing process has been removed, enhancing hydrocarbon recovery.

While hydraulic fracturing is very effective at increasing the flow of hydrocarbons from a formation, it also creates an immediate challenge that must be overcome. In particular, large quantities of fracturing sand and other solid debris are carried out of the formation and into the wellbore by the produced hydrocarbons and excess fracturing water. This "flow-back" situation can render surface equipment inoperable, as this equipment, which is designed to separate well liquid and gaseous byproducts and to meter those various output streams, is vulnerable to damage from such debris. The large quantities of fracturing sand, along with solid debris from the formation, are extremely abrasive and cause damage to chokes, pressure reducing valves, and other controls on the surface equipment. Additionally, the sand and solid debris, if not removed upstream, will collect in conventional production separators and thus render the equipment inoperable.

Accordingly, it would be desirable to provide a well production stream solid debris separator apparatus for capturing solid debris for a high-pressure stream at a wellhead which resists deterioration from the solid debris.

SUMMARY OF THE INVENTION

The present invention provides an apparatus for capturing solid debris from a well production or completion stream comprised primarily of water, hydrocarbon liquids, and hydrocarbon gases. The apparatus includes a centrifugal cylinder, disposed vertically, mounted within the upper half of a spherical pressure-containment vessel. The centrifugal cylinder is open on the bottom and substantially closed at the top, though with an opening in the center of the top to provide for stream outlet. The centrifugal cylinder may include an optional internal, abrasion-resistant lining.

The well production stream is introduced into the interior of the spherical pressure-containment vessel via a well production stream inlet port and then tangentially into the interior of the centrifugal cylinder. Centrifugal force results in the heavier solid debris moving outward to the cylinder inner wall, where it falls by gravity, exiting the centrifugal cylinder and entering the lower interior spherical space. The resulting velocity drop is sufficient to prevent the solid debris from abrading the interior wall of the spherical pressure-containment vessel.

As the solid debris continue to fall, they are intercepted by one or more solid debris interception baffles attached to the lower half of the interior surface of the spherical vessel, just below the horizontal midline. These solid debris interception baffles are oriented to intercept and dampen the rotational flow and force the captured solid debris downward toward the sump and away from the stream outlet. This allows the solid debris to fall toward and into a sump, which is attached to the lower portion of the spherical pressure-containment vessel. The sump is cylindrical, disposed vertically, and is capped on the bottom end. Alternately, the bottom end of the sump may terminate into a second pressure vessel, having an interior surface defining a spherical interior space, to increase solid debris capacity.

The well production stream solid debris separator also comprises a cylindrical stream outlet port, disposed vertically, that extends from the bottom center of the internal cylinder to an exit point at the top center of the spherical pressure-containment vessel. This functionally creates a gas-trap within the cylinder, and the resulting decrease of the fluid density within the cylinder further enhances the effect of centrifugal force upon the solid debris.

Additionally, a liquid drain/solid debris outlet port is located at the lower end of the sump. The solid debris may be dumped from the sump by utilizing either a manual valve, an automatic timed valve, or by other means. The well production stream, relatively free of solid debris, exits the vessel at the well production stream outlet port through the top of the spherical pressure-containment vessel.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
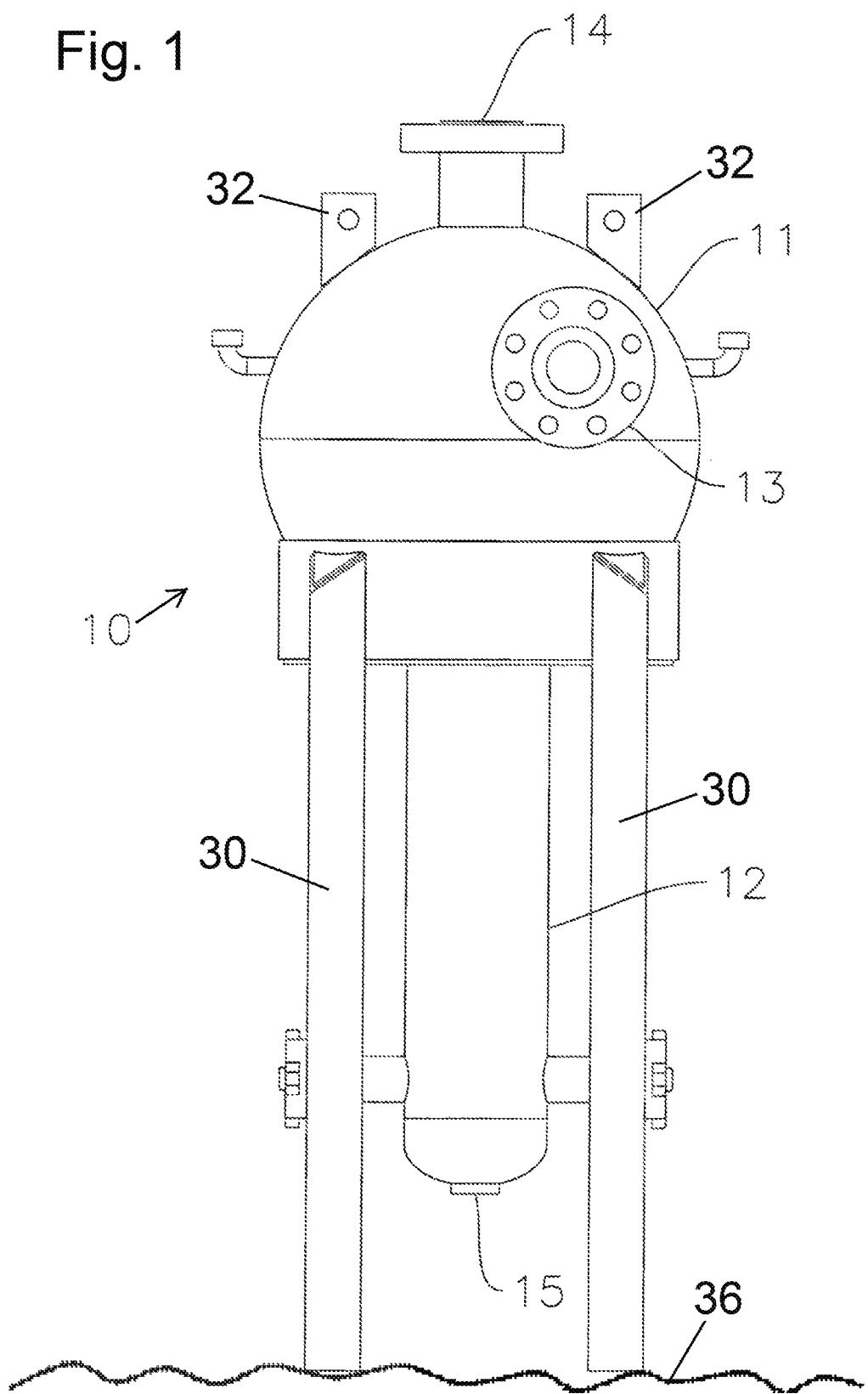
FIG. 1 is an overall front external view of a well production stream solid debris separator apparatus.
Figure 2:
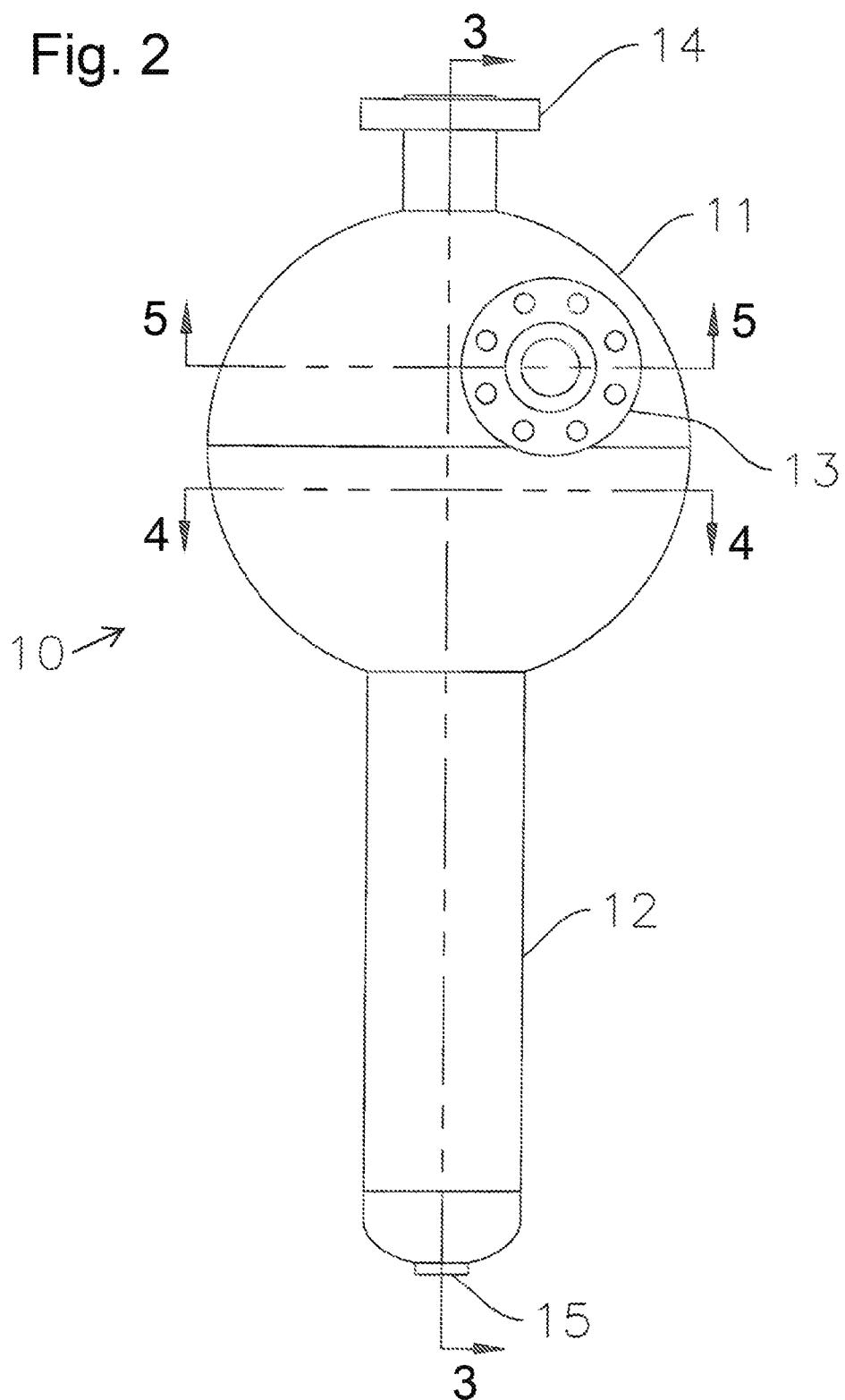
FIG. 2 is a simplified external view of the separator apparatus shown in FIG. 1.
Figure 3:
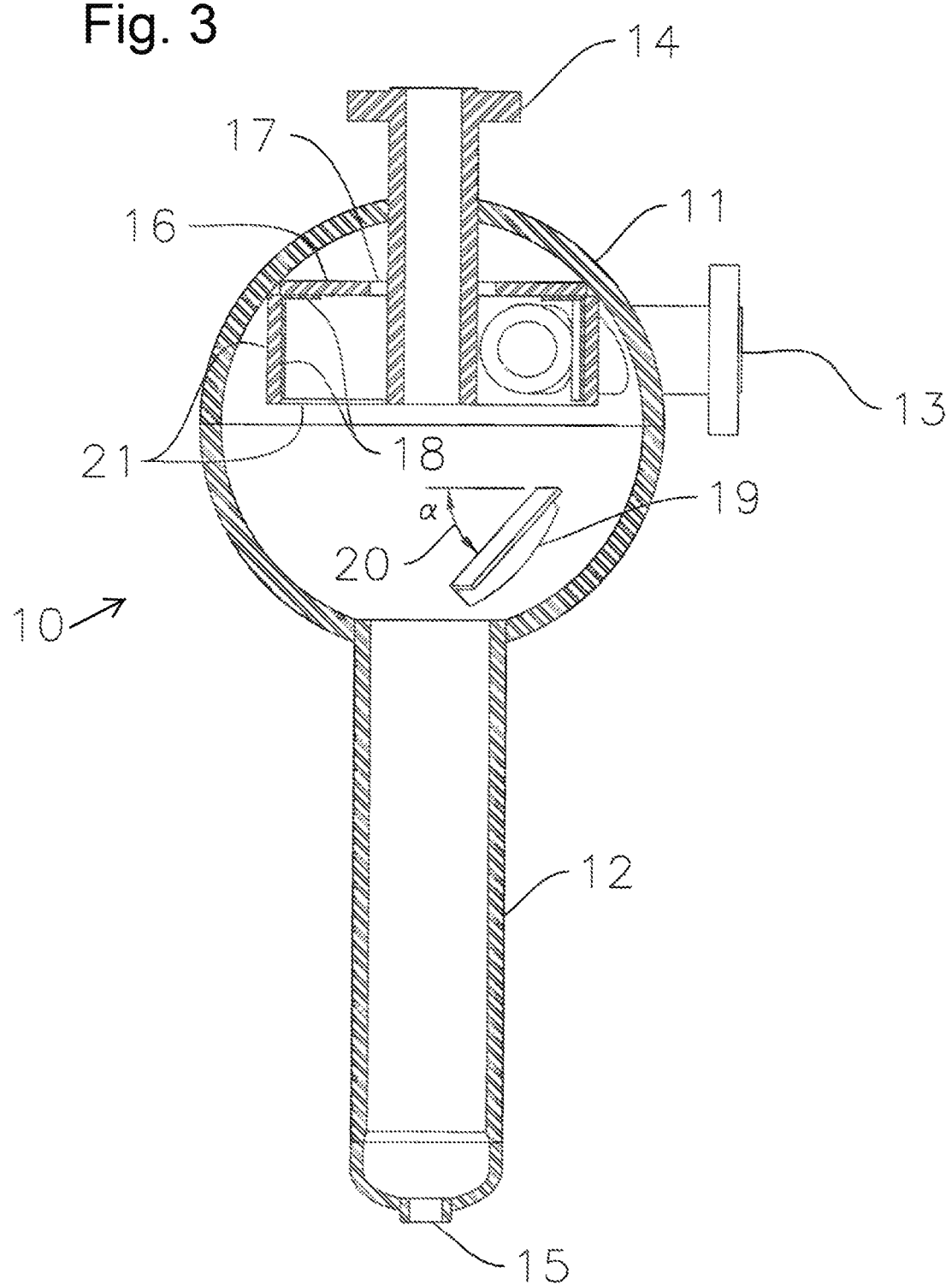
FIG. 3 is a sectional view taken along section line 3-3 of FIG. 2.
Figure 4:
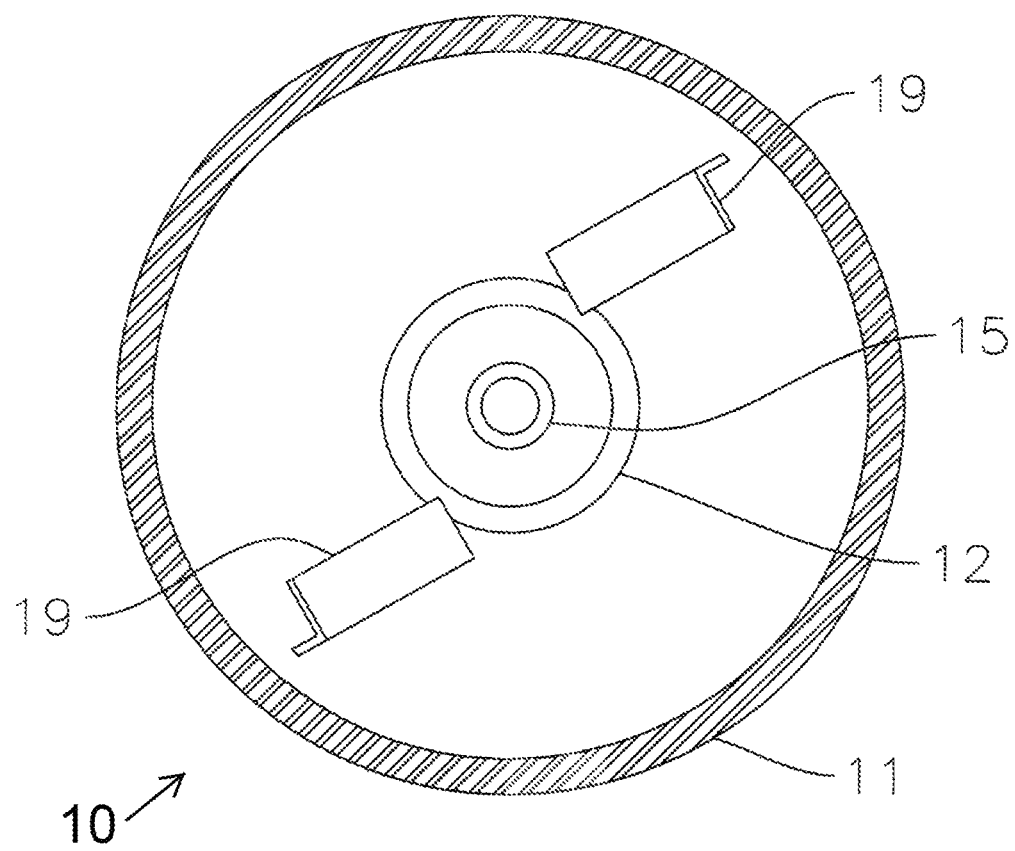
FIG. 4 is a sectional view taken along section line 4-4 of FIG. 2.
Figure 5:
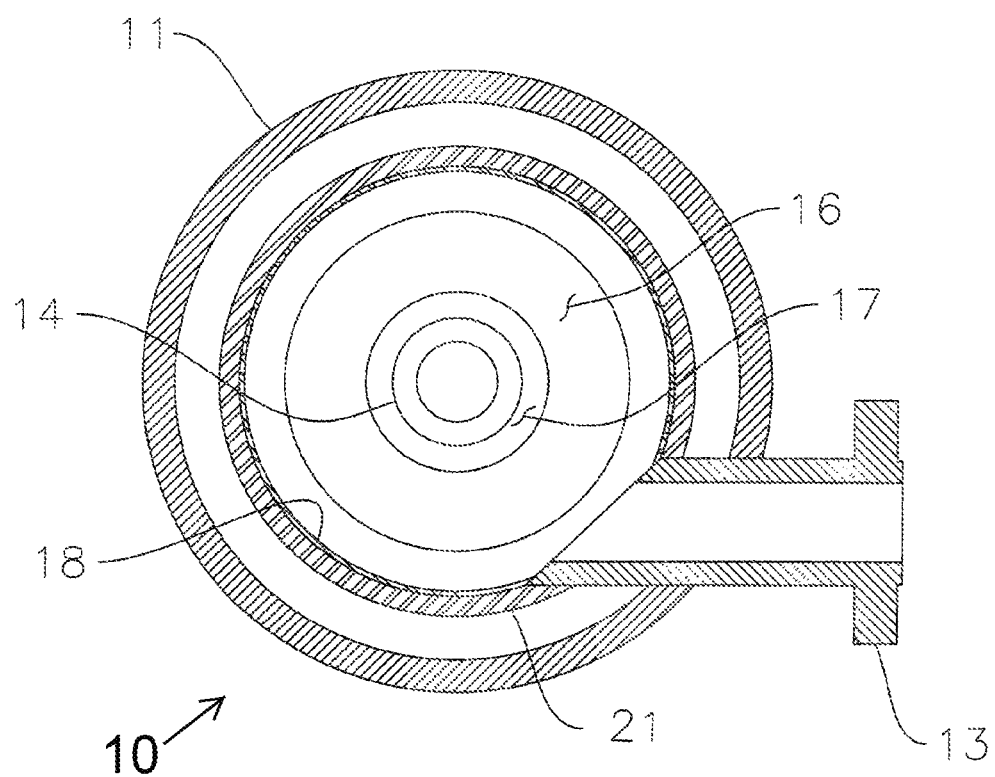
FIG. 5 is a sectional view taken along section line 5-5 of FIG. 2.
Figure 6:
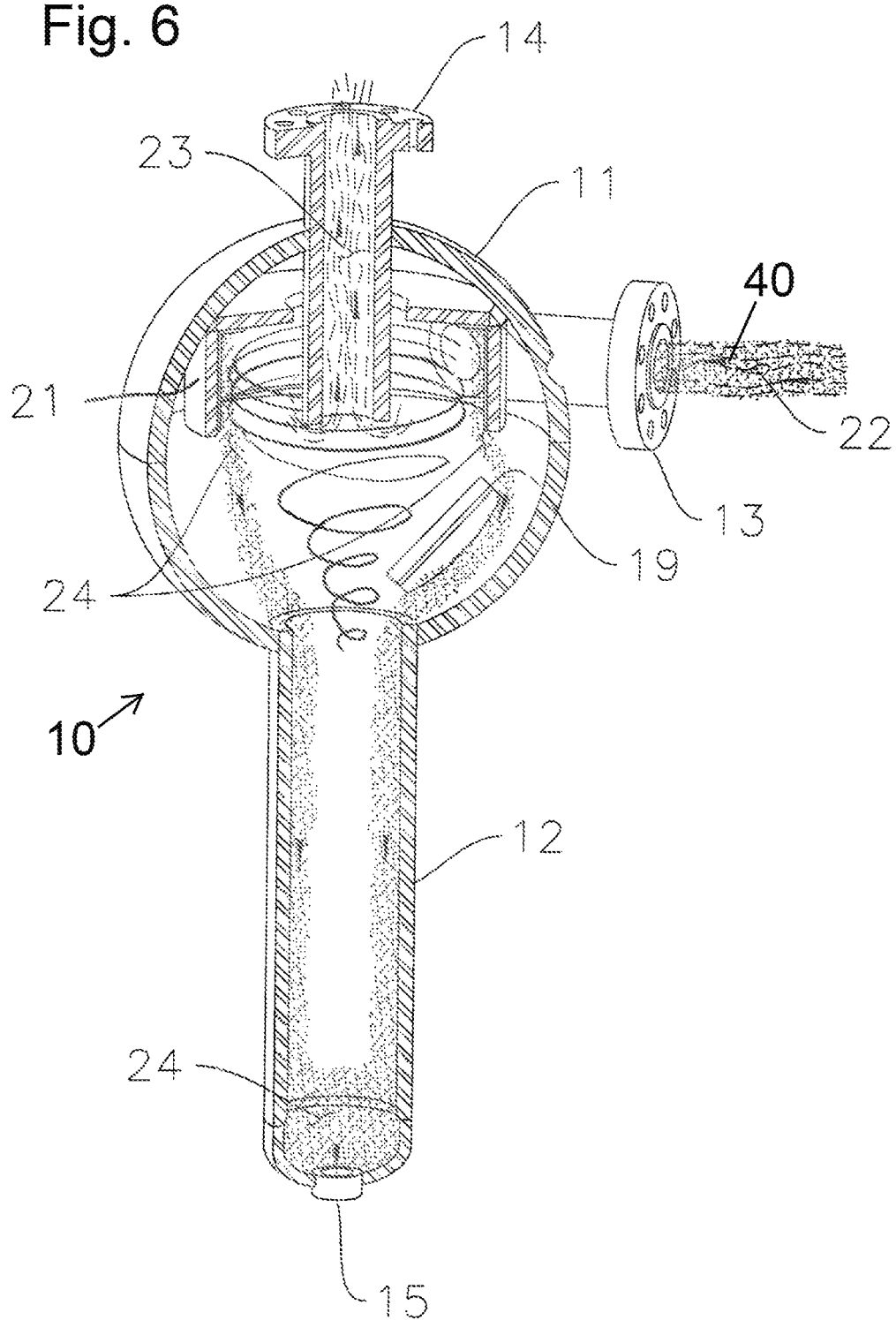
FIG. 6 is an internal view of the separator apparatus shown in FIG. 1 that depicts fluid flow and solid debris extraction and capture.

Referring to the drawings in detail, FIG. 1 illustrates an overall external view of a well production stream solid debris separator apparatus 10. FIG. 2 is a simplified external view; details that are not pertinent to the invention, such as support structure, lifting lugs, and the like, have been removed to improve clarity. FIG. 2 also defines sectional views relevant to the understanding of FIG. 3, FIG. 4, and FIG. 5. FIG. 3 represents a section 3-3 view that clarifies the design and orientation of certain preferred embodiments. FIG. 4 represents a section 4-4 view that clarifies the design and orientation of certain preferred embodiments. FIG. 5 represents a section 5-5 view that clarifies the design and orientation of certain preferred embodiments. FIG. 6 represents the flow paths of the well production stream from the inlet of the well production stream solid debris separator through the outlet of same.

As seen in FIG. 1, the apparatus may include legs 30 and other structural bracing 32.

As seen in FIG. 1 and FIG. 2, the well production stream solid debris separator apparatus 10 includes a spherical pressure-containment vessel 11. As is well known, the spherical pressure-containment vessel 11 may generally consist of two hemispherical heads welded together, with the resulting girth weld seam being disposed horizontally. The vessel 11 is a pressure-containment vessel capable of handling up to 10,000 lbs. of pressure.

The apparatus is generally oriented vertically to ground 36 so that the weld seam is substantially parallel to ground.

A sump 12 is attached to the bottom of the spherical pressure-containment vessel 11 to provide for storage of accumulated solid debris. The sump 12 is cylindrical, disposed vertically to ground 36, and is capped on the bottom end. One or more optional cleanout parts 38 may be provided. Alternately, the bottom end of the sump 12 may terminate into a second pressure vessel (not shown), having an interior surface defining a spherical interior space, to increase solid debris capacity.

The well production stream is under high pressure either from well pressure or blowback from hydraulic fracturing or both. The well production stream is introduced into the interior of the spherical pressure-containment vessel 11 via a well production stream inlet port 13. The well production stream, less the captured solid debris, exits the spherical pressure-containment vessel via a well production stream outlet port 14. The stream from the outlet port may be directed to other separators and other processing equipment. A liquid drain/solid debris outlet port 15, located at the bottom of the sump 12, allows removal of solid debris by utilizing either a manual valve, an automatic timed valve, or by other means (not shown).

As best seen in FIG. 3, with further clarification as seen in FIG. 4 and FIG. 5, a centrifugal cylinder 21, disposed substantially vertically, is centered with and mounted within the upper half of the spherical pressure-containment vessel 11. The centrifugal cylinder 21 is open on the bottom and substantially closed at the top with a donut-shaped top plate 16, though with an opening 17 in the center of the top to provide for well production stream outlet port 14. A passage exists between the outlet port 14 and the tope plate 16 of the cylinder to permit passage of fluid.

The centrifugal cylinder 21 may include an internal, abrasion-resistant lining 18.

The high-pressure well production stream is introduced into the interior of the spherical pressure-containment vessel 11 via the well production stream inlet port 13 and then tangentially into the interior of the cylinder 21. Arrow 40 in FIG. 6 illustrates the direction of the incoming stream. As seen in FIG. 5, the terminal end portion of the well production stream inlet port 13 that is interior to the centrifugal cylinder 21 is mitered to generally match or conform to the inside diameter of the cylinder 21.

An open bottom of the well production stream outlet port 14 that is interior to the cylinder 21 is positioned to generally match the level bottom of the cylinder 21. The well production stream outlet port 14 and the centrifugal cylinder 21 share the same axis and vertical center line.

Furthermore, FIG. 3 and FIG. 4 depict placement of one or more optional solid debris interception baffles 19, which are attached to the lower half of the interior spherical surface, just below the horizontal midline. The solid debris interception baffles 19 have a substantially L-shaped cross-section, are open at the top and bottom, with one leg of the "L" being attached perpendicularly to the interior of the spherical pressure-containment vessel and the other leg of the "L" oriented toward the direction of fluid flow. In one preferred configuration, the solid debris interception baffles 19 are oriented at an angle depicted by arrow 20 of approximately 45°, although orientation between 40° and 50° is possible.

FIG. 6 depicts a sectional view of the apparatus 10 showing the well production stream component flow from the inlet flow 22 through the outlet flow 23 and clarifies the device-induced flow direction changes that result in the separation and extraction of the solid debris 24 from the inlet flow 22. The flow path of the intercepted and retained solid debris 24 is also shown. The incoming well production stream 22 is introduced into the interior of the spherical pressure-containment vessel 11 via the well production stream inlet port 13 and then tangentially into the interior of the centrifugal cylinder 21. Centrifugal force results in the heavier solid debris 24 moving outward to the cylinder 21 inner wall, where it falls by gravity, exiting the centrifugal cylinder 21 and entering the lower interior spherical space. The resulting velocity drop is sufficient to prevent the solid debris 24 from abrading the interior wall of the spherical pressure-containment vessel 11. As the solid debris continue to fall, they are intercepted by one or more solid debris interception baffles 19 attached to the lower half of the interior spherical surface, just below the horizontal midline. These solid debris interception baffles 19 are oriented to intercept and dampen the rotational flow and force the captured solid debris 24 downward toward the sump 12 and away from the stream outlet 23. This allows the solid debris 24 to fall into the sump 12, which is attached to and extends from the lower portion of the spherical pressure-containment vessel 11.

In summary, the present invention provides an apparatus for capturing solid debris—generally sand and rock—from a well production or completion stream comprised of water, hydrocarbon liquid, and hydrocarbon gas. A well production stream solid debris separator apparatus includes an upper pressure-containment vessel having an interior surface defining a spherical interior space. A centrifugal cylinder, disposed vertically, is mounted in the upper half of the spherical pressure-containment vessel. The pressurized well production stream is introduced into the spherical interior space and then tangentially into the cylinder. The centrifugal cylinder protects the spherical pressure-containment vessel from structural damage due to abrasion and is sized to produce sufficient stream retention to allow the resulting centrifugal force to move the heavier solid debris outward to the cylinder inner wall, where it falls, exiting the cylinder and entering the lower interior spherical space. The resulting velocity drop is sufficient to prevent the solid debris from abrading the interior wall of the spherical vessel. The separator apparatus also comprises a plurality of solid debris interception baffles attached to the lower half of the interior spherical surface to direct the solid debris into a sump, which is attached to the lower portion of the spherical vessel. The sump is provided to increase solid debris capacity. The separator also includes a well production stream outlet port at the top of the vessel and a liquid drain/solid debris outlet port at the lower end of the sump.

The present invention may be utilized at the surface of a well at the wellhead and may be used with other separators and processing equipment.

In order to assess the performance of the present invention, a series of computational fluid dynamics (CFD) calculations were conducted. It was determined that a 200 μm diameter particulate approaches the lower bound of most sand size distributions that would likely be experienced. Based on a simulation generated, most distributions of sand particles entering the apparatus will likely be separated from the major inflow stream with very high efficiency, upwards of 85% or higher.

Whereas, the invention has been described in relation to the drawings attached hereto, it should be understood that other and further modifications, apart from those shown or suggested herein, may be made within the scope of this invention.

What is claimed is:

1. A well production stream solid debris separator apparatus, which comprises:
    a spherical containment vessel;
    a cylindrical sump extending below and radially from said spherical containment vessel;
    a centrifugal cylinder within said spherical vessel, said centrifugal cylinder having an axis concentric with a diameter of said spherical vessel and having an open bottom, wherein said centrifugal cylinder has a substantially closed top and an opening passage in said top, and wherein said centrifugal cylinder is mounted within an upper hemisphere of the spherical containment vessel;
    an outlet port passing through said centrifugal cylinder and through said spherical containment vessel, said outlet port opposed to said sump, wherein said centrifugal cylinder axis is concentric with an axis of said outlet port; and
    an inlet port passing through said spherical containment vessel and passing into said centrifugal cylinder substantially tangential to an inner surface of said centrifugal cylinder.

2. The well production stream solid debris separator apparatus as set forth in claim 1 with at least one interception baffle within said spherical vessel.

3. The well production stream solid debris separator apparatus as set forth in claim 2 wherein said at least one interception baffle has an attachment leg and an interception leg and wherein said baffle has an L-shaped cross-section.

4. The well production stream solid debris separator apparatus as set forth in claim 2 wherein said at least one interception baffle is at an angle of between 40° to 50° from a plane perpendicular to said centrifugal cylinder.

5. The well production stream solid debris separator apparatus as set forth in claim 4 wherein said at least one interception baffle is at an angle of approximately 45°.

6. The well production stream solid debris separator apparatus as set forth in claim 1 wherein said outlet port extends to said open bottom of said centrifugal cylinder.

7. The well production stream solid debris separator apparatus as set forth in claim 1 wherein said cylindrical sump has at least one cleanout access port.

8. The well production stream solid debris separator apparatus as set forth in claim 1 wherein said spherical vessel has the upper hemisphere joined with a lower hemisphere and wherein said centrifugal cylinder is within said upper hemisphere.

9. The well production stream solid debris separator apparatus as set forth in claim 1 wherein said centrifugal cylinder has an abrasion-resistant inner lining.

10. The well production stream solid debris separator apparatus as set forth in claim 1 wherein a terminal end of said inlet port is mitered to match an inside diameter of said centrifugal cylinder.

\* \* \* \* \*